United States Patent
Wilkinson et al.

(10) Patent No.: US 12,381,428 B2
(45) Date of Patent: Aug. 5, 2025

(54) COIL LEAD TENSION CLENCH LOCK SLOT

(71) Applicant: Hamilton Sundstrand Corporation, Charlotte, NC (US)

(72) Inventors: Andrew R. Wilkinson, Cherry Valley, IL (US); Mary Christelle Ann Calacal, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 189 days.

(21) Appl. No.: 18/199,753

(22) Filed: May 19, 2023

(65) Prior Publication Data

US 2024/0388153 A1 Nov. 21, 2024

(51) Int. Cl.
*H02K 3/18* (2006.01)
*H02K 1/24* (2006.01)
*H02K 3/51* (2006.01)
*H02K 15/095* (2006.01)

(52) U.S. Cl.
CPC ............ *H02K 3/18* (2013.01); *H02K 1/24* (2013.01); *H02K 15/095* (2013.01)

(58) Field of Classification Search
CPC .......... H02K 3/18; H02K 1/24; H02K 15/095; H02K 3/527; H02K 3/521; H02K 3/51; H01R 13/58; H01R 13/5841
USPC ............................ 439/457; 29/564.5; 310/71
See application file for complete search history.

(56) References Cited

U.S. PATENT DOCUMENTS

| | | | | |
|---|---|---|---|---|
| 3,502,917 A | * | 3/1970 | Bizoe | H02K 5/225 310/71 |
| 4,105,907 A | * | 8/1978 | Hagenlocher | H01R 39/34 310/263 |
| 4,216,455 A | | 8/1980 | Hester | |
| 4,999,532 A | * | 3/1991 | Bartell | H02K 3/522 439/457 |
| 5,233,751 A | | 8/1993 | Luciani et al. | |

(Continued)

FOREIGN PATENT DOCUMENTS

| | | |
|---|---|---|
| DE | 102016220119 A1 | 4/2018 |
| DE | 102020109019 A1 | 10/2021 |

(Continued)

OTHER PUBLICATIONS

European Search Report dated Oct. 15, 2024 in connection with European Patent Application No. 24176786.2, 30 pages.

*Primary Examiner* — Burton S Mullins

(57) ABSTRACT

An electric machine assembly includes a rotor core. The rotor core includes a plurality of winding poles extending between a first axial face and a second axial face of the rotor core. A clench lock slot is defined in the first axial face. The clench lock slot includes a first channel section having a first channel width, a second channel section having a width equal to the first channel width, and a converging-diverging section connecting between the first channel section and the second channel section. A first end of the converging-diverging section connects to the first channel section and has a width equal to the first channel width. A second end of the converging-diverging section connects to the second channel section and has a width equal to the first channel width. A clench point of the converging-diverging section is defined where the converging-diverging section is narrowest.

20 Claims, 2 Drawing Sheets

(56) References Cited

U.S. PATENT DOCUMENTS

| | | | | |
|---|---|---|---|---|
| 7,933,484 B2 * | 4/2011 | Hetzer | ............... | G02B 6/44785 |
| | | | | 385/136 |
| 7,942,690 B2 * | 5/2011 | Berkobin | ........... | H01R 13/5841 |
| | | | | 439/456 |
| 9,502,071 B2 | 11/2016 | Sato et al. | | |
| 2004/0017128 A1 | 1/2004 | York et al. | | |
| 2023/0117021 A1 * | 4/2023 | Eibl | ....................... | H02K 15/12 |
| | | | | 310/45 |

FOREIGN PATENT DOCUMENTS

| | | |
|---|---|---|
| JP | H099546 A | 1/1997 |
| JP | 3611411 B2 | 1/2005 |

\* cited by examiner

COIL LEAD TENSION CLENCH LOCK SLOT

BACKGROUND

1. Field

The present disclosure relates to magnetic windings for electrical machines, and more particularly to clench lock slots for winding wires.

2. Description of Related Art

High speed generator rotor assemblies induce large dynamic centripetal forces that need stiff reliable structures which can withstand those loads. A common problematic mode of the rotor assembly is a progression of vibration imbalance that can ultimately result in failure if not addressed. The failure point of this anomaly results with a break of the main field lead wire and is typically the source of the originating vibration imbalance.

Typically, high speed main field generator rotors require precision wound interlocking layers of magnet wire that result in a rigid assembly. There are typically two manufacturing styles of precision wound coils, one is a large resistive drag force that 'yields' the wire, or two is a tension that maintains an elastic compressive spring force that stabilizes the coil wire.

The problematic issues materialize when the final tensioned magnet wire wind of the coil lead either needs to transition to the next pole or terminates at a local lug of the existing pole. The manufacturing limitations cause loss of tension on that transitioning lead wire, ultimately resulting in an inconsistent localized coil tension which is more susceptible to fatigue and failure.

The conventional techniques have been considered satisfactory for their intended purpose. However, there is an ever present need for improved systems and methods for improved windings for electric machines. This disclosure provides a solution for this need.

SUMMARY

An electric machine assembly includes a rotor core configured to rotate around a rotation axis. The rotor core includes a plurality of winding poles extending between a first axial face and a second axial face of the rotor core. A clench lock slot is defined in the first axial face. The clench lock slot includes a first channel section having a first channel width, a second channel section having a width equal to the first channel width, and a converging-diverging section connecting between the first channel section and the second channel section. A first end of the converging-diverging section connects to the first channel section and has a width equal to the first channel width. A second end of the converging-diverging section connects to the second channel section and has a width equal to the first channel width. A clench point of the converging-diverging section is defined where the converging-diverging section is narrowest. The clench point has a channel width that is narrower than the first channel width.

A winding wire can be wound around a first winding pole of the rotor core. A portion of the winding wire can extend through the first channel section, can be clenched at the clench point, and can extend at least part way through the second channel section. The winding wire can have a diameter equal to the first channel width. The winding wire can be in elastic deformation at the clench point. The winding wire can continue from the clench lock slot to a second winding pole of the rotor core. The winding wire can continue from the clench lock slot to a terminal lug affixing and end of the winding wire to the first axial face of the rotor core.

The clench point can have a channel width equal to B, wherein $$A < B \le M,$$

where A equals the diameter of the winding wire under tension, and M is the diameter of the winding wire if it were under maximum allowable tension. The converging diverging section can have a length from the first channel section to the second channel section of $$C = 3A,$$

where A is the diameter of the winding wire under tension.

A method of making an electric machine rotor includes winding a winding wire around a rotor pole of a rotor core while maintaining tension on the winding wire, wherein the winding wire has a diameter under tension equal to A. Upon completing winding of the winding wire around the rotor pole, the method includes clenching a portion of the winding wire in a clench lock slot to lock the tension in the winding wire on the rotor pole. The clench lock slot elastically deforms the winding wire in a converging-diverging channel section with a clench point having a smaller channel width than A.

Clenching the portion of the winding wire in the clench lock slot can include pressing the wire laterally into the clench lock slot relative to a longitudinal axis defined by the clench lock slot. The method can include continuing with the winding wire from the clench lock slot to wind the winding wire around a second winding pole of the rotor core with the clench lock slot maintaining tension on the winding wire around the first rotor pole. The method can include affixing an end of the winding wire extending away from the first rotor pole and from the clench lock slot to the first axial face of the rotor core with a terminal lug.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
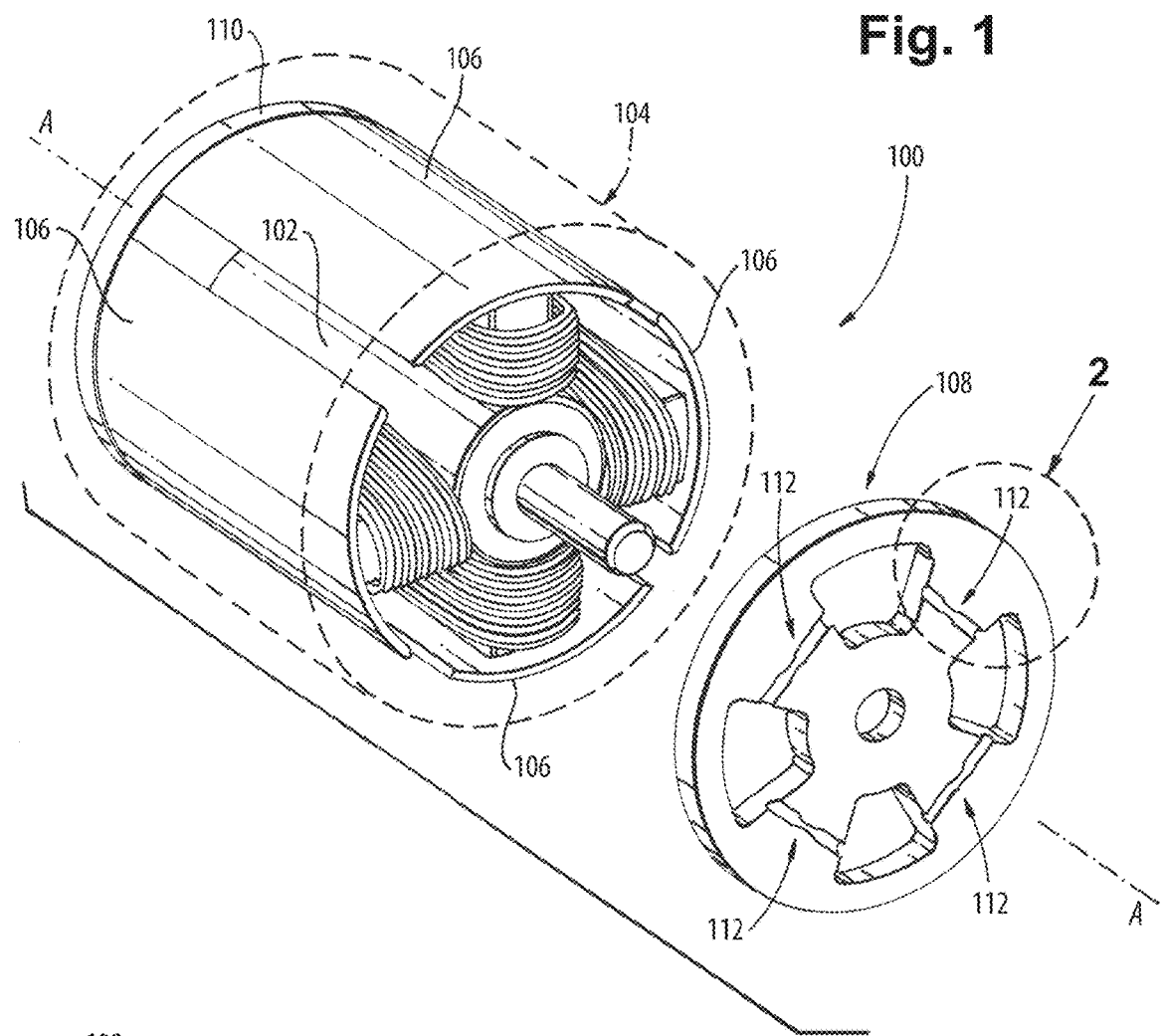
FIG. 1 is an exploded schematic perspective view of an embodiment of an electric machine assembly constructed in accordance with the present disclosure, showing the rotor core and winding wires.

Reference will now be made to the drawings wherein like reference numerals identify similar structural features or aspects of the subject disclosure. For purposes of explanation and illustration, and not limitation, a partial view of an embodiment of an electric machine assembly in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to maintain tension on winding wires during and after the winding process without damaging the wires in electric machines such as motors and generators.

The electric machine assembly 100 includes a rotor core 102 configured to rotate around a rotation axis A relative to a stator 104. The rotor core 104 includes a plurality of winding poles 106 extending between a first axial face 108, e.g. end winding support, and a second axial face 110 of the rotor core 102. One or more clench lock slots 112 is/are defined in the first axial face 108.

Figure 2:
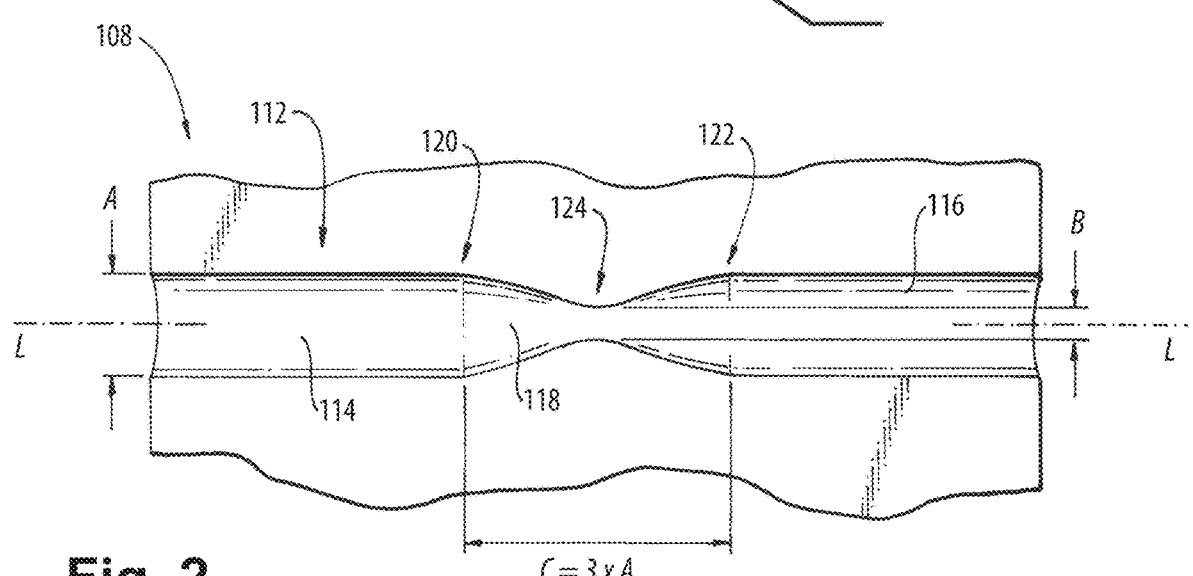
FIG. 2 is a schematic perspective view of a portion of the electric machine assembly of FIG. 1, showing the clench lock slot.

With reference now to FIG. 2, each clench lock slot 112 includes a first channel section 114 having a first channel width A lateral to a longitudinal channel axis L, e.g. if the channel is radiused then the channel width can be its diameter. A second channel section 116 of the clench lock slot 112 has also equal to the first channel width A. The clench lock slot 112 also includes a converging-diverging section 118 connecting between the first and second channel sections 114, 116. A first end 120 of the converging-diverging section 118 connects to the first channel section 114 and has a width equal to the first channel width A. A second end 122 of the converging-diverging section 118 connects to the second channel section 116 and has a width equal to the first channel width A. A clench point 124 of the converging-diverging section 118 is defined where the converging-diverging section 118 is narrowest, and the clench point is radiused inward from both sides of the clench lock slot 112, i.e. inward from the top and bottom as oriented in FIG. 2. Those skilled in the art will readily appreciate that the first and second channel sections 114, 116 can optionally be negligibly short or even eliminated for applications where appropriate.

The clench point 124 has a channel width B that is narrower than the first channel width A, wherein $$A < B \leq M,$$

where A equals the diameter of the winding wire under tension, e.g. with a 1% elongation for a coil winding, M is the diameter of the winding wire if it were under maximum allowable tension, e.g. at 5% elongation, e.g. where the elongation and maximum allowable tension requirements are defined by a standard work for a given application. The converging diverging section 118 has a length along the longitudinal axis L from the first channel section 114 to the second channel section 116, i.e. between the ends 120, 122, of $$C = 3A,$$

where A is the channel width of the first and second channel sections 114, 116.

Figure 3:
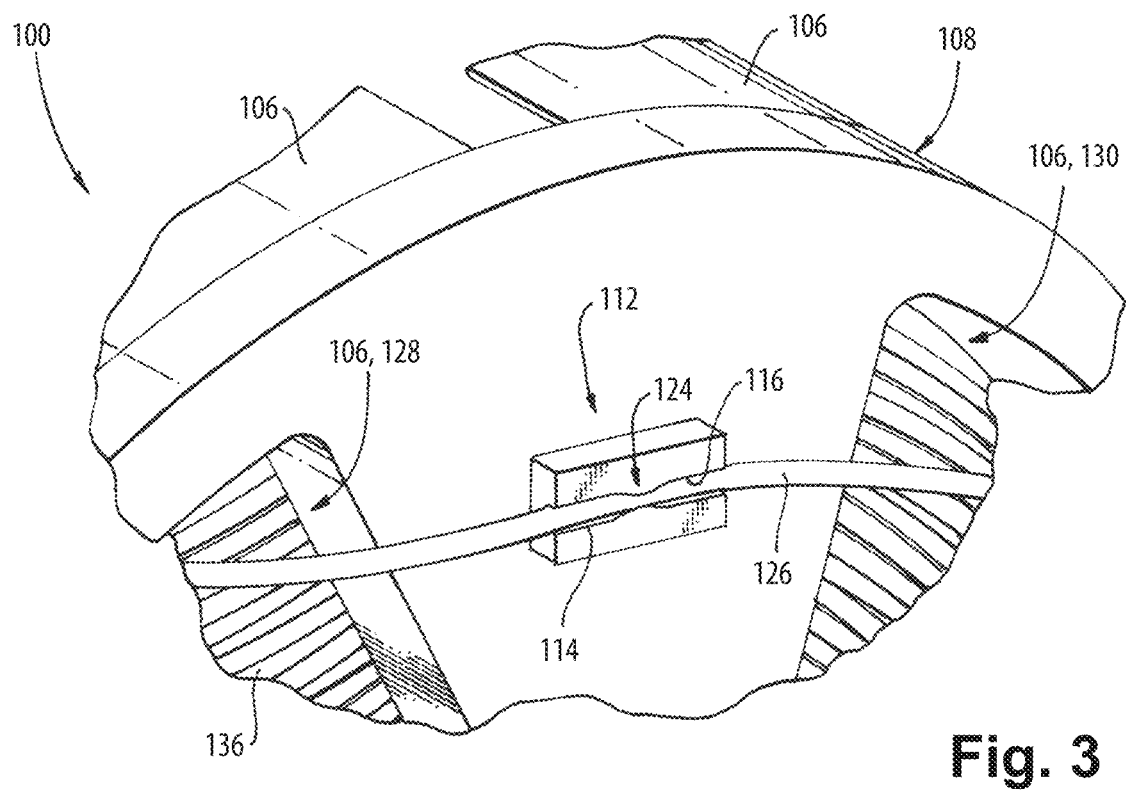
FIG. 3 is a schematic perspective view of a portion of the electric machine assembly of FIG. 1, showing a winding wire passing through the clench lock slot to a second rotor pole.
Figure 4:
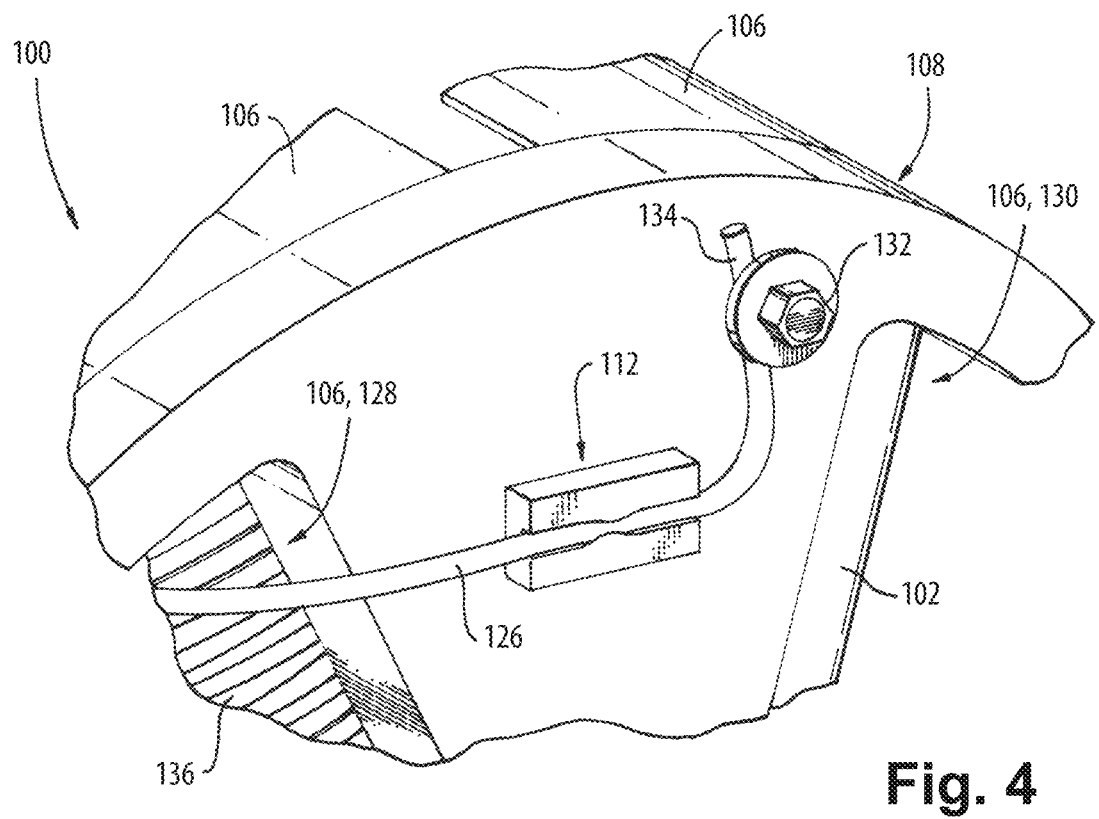
FIG. 4 is a schematic perspective view of a portion of the electric machine assembly of FIG. 1, showing the winding wire passing through the clench lock slot to a terminal lug.

With reference now to FIG. 3, a winding wire 126 is wound around a first winding pole 128 of the rotor core 102. A portion of the winding wire 126 extends through the first channel section 114 of the clench lock slot 112, is clenched at the clench point 124, and extends at least part way through the second channel section 116. The winding wire 126 has a diameter equal to the first channel width A (labeled in FIG. 2). The winding wire 126 is in elastic deformation at the clench point 124, but is not elastically deformed due to the dimensions of the clench point as described above with reference to FIG. 2. The winding wire 126 continues from the clench lock slot 112 to a second winding pole 130 of the rotor core. As shown in FIG. 4, it is also contemplated that the winding wire 128 can instead continue from the clench lock slot 112 to a terminal lug 132 affixing and end 134 of the winding wire 126 to the first axial face 108 of the rotor core 120.

A method of making an electric machine rotor includes winding a winding wire 126 around a rotor pole 106/128 of a rotor core 102 while maintaining tension on the winding wire 126, wherein the winding wire 126 has a diameter under tension equal to A (labeled in FIG. 2). Upon completing winding of the winding wire 126 around the rotor pole 106/128, the method includes clenching a portion of the winding wire 126 in a clench lock slot 112 to lock the tension in the winding wire 126 on the rotor pole 106/128. The clench lock slot 112 elastically deforms the winding wire in a converging-diverging channel section 118 (labeled in FIG. 2) of a clench lock slot 112 with a clench point 124 having a smaller channel width than A as described above.

Clenching the portion of the winding wire 126 in the clench lock slot 112 includes pressing the wire laterally into the clench lock slot 112 relative to a longitudinal axis L (labeled in FIG. 2) defined by the clench lock slot 112, i.e. pressing the winding wire 126 inward into the clench lock slot 112 in a direction along the axis A labeled in FIG. 1. The method can include continuing with the winding wire 126 from the clench lock slot 112 to wind the winding wire around a second winding pole 106/130 of the rotor core 102 with the clench lock slot 112 maintaining tension on the winding wire 126 around the first rotor pole 128 while winding the winding wire 126 about the second rotor pole 130, as shown in FIG. 3. It is also contemplated that the method can include comprising affixing an end 136 of the winding wire 126 extending away from the first rotor pole 128 and from the clench lock slot 112 to the first axial face 108 of the rotor core 102 with a terminal lug 132 to maintain tension on the windings 134 of the winding wire 126 on the first pole 128. The dimensions for the converging-diverging section 118 described above with respect to FIG. 2 can ensure that the clench lock feature will not violate the linear elastic properties of the wire 126 under tension and can also ensure that the wire 126 has consistent spring force within the clench lock slot 112. Those skilled in the art will readily appreciate that any edges that the winding wires come into contact with, such as edges at the ends of the first and second channel sections 114, 116, can be radiused to reduce digging into the winding wire.

Systems and methods as disclosed herein provide potential benefits including the following. They can provide consistent wire tension on pole termination or pole transitions. They can improve dynamic system stabilization relative to traditional techniques. They can also increase reliability of electrical machines relative to traditional techniques.

The methods and systems of the present disclosure, as described above and shown in the drawings, provide for maintaining tension on winding wires during and after the winding process without damaging the wires in electric machines such as motors and generators. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electric machine assembly comprising:
a rotor core configured to rotate around a rotation axis, wherein the rotor core includes a plurality of winding poles extending between a first axial face and a second axial face of the rotor core;
a clench lock slot defined in the first axial face, wherein the clench lock slot includes:
a first channel section having a first channel width;
a second channel section having a width equal to the first channel width; and
a converging-diverging section connecting between the first channel section and the second channel section, wherein a first end of the converging-diverging section connects to the first channel section and has a width equal to the first channel width,
wherein a second end of the converging-diverging section connects to the second channel section and has a width equal to the first channel width, and
wherein a clench point of the converging-diverging section is defined where the converging-diverging section is narrowest, wherein the clench point has a channel width that is narrower than the first channel width; and
a winding wire wound around a first winding pole of the rotor core and wherein the winding wire continues from the clench lock slot to a second winding pole of the rotor core.

2. The assembly as recited in claim 1, wherein a portion of the winding wire extends through the first channel section, is clenched at the clench point, and extends at least part way through the second channel section.

3. The assembly as recited in claim 2, wherein the winding wire has a diameter equal to the first channel width.

4. The assembly as recited in claim 3, wherein the winding wire is in elastic deformation at the clench point.

5. The assembly as recited in claim 3, wherein the clench point has a channel width equal to B, wherein $$A > B \geq M,$$

where A equals the diameter of the winding wire under tension, and M is a diameter of the winding wire if it were under maximum allowable tension.

6. The assembly as recited in claim 5, wherein the converging-diverging section has a length from the first channel section to the second channel section of $$C=3A,$$

where A is the diameter of the winding wire under tension.

7. A method of making an electric machine rotor comprising:
winding a winding wire around a first rotor pole of a rotor core while maintaining tension on the winding wire, wherein the winding wire has a diameter under tension equal to A;
upon completing winding of the winding wire around the first rotor pole, clenching a portion of the winding wire in a clench lock slot to lock the tension in the winding wire on the first rotor pole, wherein the clench lock slot elastically deforms the winding wire in a converging-diverging channel section with a clench point having a smaller channel width than A; and
continuing with the winding wire from the clench lock slot to wind the winding wire around a second winding pole of the rotor core with the clench lock slot maintaining tension on the winding wire around the first rotor pole, or
affixing an end of the winding wire extending away from the first rotor pole and from the clench lock slot to a first axial face of the rotor core with a terminal lug.

8. The method as recited in claim 7, wherein clenching the portion of the winding wire in the clench lock slot includes pressing the wire laterally into the clench lock slot relative to a longitudinal axis defined by the clench lock slot.

9. The method as recited in claim 7, further comprising continuing with the winding wire from the clench lock slot to wind the winding wire around a second winding pole of the rotor core with the clench lock slot maintaining tension on the winding wire around the first rotor pole.

10. The method as recited in claim 7, further comprising affixing an end of the winding wire extending away from the first rotor pole and from the clench lock slot to the first axial face of the rotor core with a terminal lug.

11. The method as recited in claim 7, wherein the clench lock slot includes:
a first channel section having a first channel width;
a second channel section having a width equal to the first channel width; and
a converging-diverging section connecting between the first channel section and the second channel section, wherein the clench point is defined at a narrowest point in the converging-diverging channel section.

12. The method as recited in claim 11, wherein the clench point has a channel width equal to B, wherein $$A > B \geq M,$$

where A equals the diameter of the winding wire under tension,
M is the diameter of the winding wire if it were under maximum allowable tension.

13. The method as recited in claim 12, wherein the converging-diverging section has a length from the first channel section to the second channel section of $$C=3A,$$

where A is the diameter of the winding wire under tension.

14. An electric machine assembly comprising:
a rotor core configured to rotate around a rotation axis, wherein the rotor core includes a plurality of winding poles extending between a first axial face and a second axial face of the rotor core;
a clench lock slot defined in the first axial face, wherein the clench lock slot includes:

a first channel section having a first channel width;

a second channel section having a width equal to the first channel width; and a converging-diverging section connecting between the first channel section and the second channel section, wherein a first end of the converging-diverging section connects to the first channel section and has a width equal to the first channel width, wherein a second end of the converging-diverging section connects to the second channel section and has a width equal to the first channel width, and wherein a clench point of the converging-diverging section is defined where the converging-diverging section is narrowest, wherein the clench point has a channel width that is narrower than the first channel width; and a winding wire wound around a first winding pole of the rotor core and wherein the winding wire continues from the clench lock slot to a terminal lug affixing an end of the winding wire to the first axial face of the rotor core.

15. The assembly as recited in claim 14, wherein a portion of the winding wire extends through the first channel section, is clenched at the clench point, and extends at least part way through the second channel section.

16. The assembly as recited in claim 15, wherein the winding wire has a diameter equal to the first channel width.

17. The assembly as recited in claim 16, wherein the winding wire is in elastic deformation at the clench point.

18. The assembly as recited in claim 16, wherein the clench point has a channel width equal to B, wherein $$A > B \geq M,$$

where A equals the diameter of the winding wire under tension, and M is a diameter of the winding wire if it were under maximum allowable tension.

19. The assembly as recited in claim 18, wherein the converging-diverging section has a length from the first channel section to the second channel section of $$C=3A,$$

where A is the diameter of the winding wire under tension.

20. The assembly as recited in claim 19, wherein edges of the first channel section and the second channel section are radiused to reduce digging into the winding wire.

* * * * *